United States Patent
Ivory et al.

(10) Patent No.: US 10,803,232 B2
(45) Date of Patent: *Oct. 13, 2020

(54) OPTIMIZING LOADING OF WEB PAGE BASED ON AGGREGATED USER PREFERENCES FOR WEB PAGE ELEMENTS OF WEB PAGE

(71) Applicant: International Business Machines Corporation, Armonk, NY (US)

(72) Inventors: Andrew J. Ivory, Wake Forest, NC (US); Todd E. Kaplinger, Raleigh, NC (US); Aaron K. Shook, Raleigh, NC (US); David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1498 days.

This patent is subject to a terminal disclaimer.

(21) Appl. No.: 13/911,953

(22) Filed: Jun. 6, 2013

(65) Prior Publication Data

US 2014/0365864 A1    Dec. 11, 2014

(51) Int. Cl.
*G06F 17/22* (2006.01)
*G06F 16/957* (2019.01)
(Continued)

(52) U.S. Cl.
CPC .......... *G06F 40/14* (2020.01); *G06F 16/9035* (2019.01); *G06F 16/957* (2019.01);
(Continued)

(58) Field of Classification Search
CPC .. G06F 17/2247; G06F 17/24; G06F 17/2241; G06F 16/958; G06F 16/957;
(Continued)

(56) References Cited

U.S. PATENT DOCUMENTS 5,708,845 A * 1/1998 Wistendahl et al. .......... 715/202
6,456,600 B1 * 9/2002 Rochberger ............ H04L 45/02
370/238.1

(Continued)

FOREIGN PATENT DOCUMENTS

CA    2411142 A1    12/2001
CA    2752898 A1    3/2012

(Continued)

OTHER PUBLICATIONS

James Burke, Simplicity and JavaScript Modules, Jan. 11, 2012, pp. 1, 2, and 5, found at http://tagneto.blogspot.com/2012/01/simplicity-and-javascript-modules.html (last visited on Apr. 30, 2015).*

(Continued)

*Primary Examiner* — Chau T Nguyen
(74) *Attorney, Agent, or Firm* — Robert A. Voigt, Jr.; Winstead PC (57) ABSTRACT

A method, system and computer program product for optimizing the loading of a web page. The server receives indications (e.g., Document Object Model (DOM) elements) of web page elements of interest of a web page from multiple client devices. The server updates a list of web page elements for the requested web page that is sorted in terms of popularity based on these received indications of web page elements of interest. The server may then appropriately respond to a request to retrieve that web page by accessing such a list and transmitting to the browser of the requesting client device the data to populate the content of the web page elements for the requested web page in an order based on the sorted list. In this manner, the browser will be able to optimize the loading of the web page.

10 Claims, 7 Drawing Sheets

(51) Int. Cl.
*G06F 16/958* (2019.01)
*G06F 40/14* (2020.01)
*G06F 16/9035* (2019.01)
*G06F 16/9535* (2019.01)
*G06F 40/137* (2020.01)

(52) U.S. Cl.
CPC ........ *G06F 16/958* (2019.01); *G06F 16/9535* (2019.01); *G06F 16/9574* (2019.01); *G06F 40/137* (2020.01); *G06F 2201/875* (2013.01)

(58) Field of Classification Search
CPC .... G06F 16/9574; G06F 40/137; G06F 40/14; G06F 16/9035; G06F 16/9535
USPC ......................................................... 715/234
See application file for complete search history.

(56) References Cited

U.S. PATENT DOCUMENTS

| | | | |
|---|---|---|---|
| 7,412,644 B2 | 8/2008 | Kieffer | |
| 7,581,170 B2 | 8/2009 | Baumgartner et al. | |
| 8,037,484 B2* | 10/2011 | Backhouse | G06F 8/38 |
| | | | 719/328 |
| 8,225,195 B1* | 7/2012 | Bryar | G06F 17/30905 |
| | | | 715/200 |
| 8,886,799 B1* | 11/2014 | Zhang | G06Q 30/0241 |
| | | | 709/218 |
| 9,064,028 B2 | 6/2015 | Shen et al. | |
| 9,477,376 B1* | 10/2016 | Stout | G06F 16/335 |
| 2002/0075302 A1* | 6/2002 | Simchik | G06F 17/30905 |
| | | | 715/745 |
| 2005/0086344 A1* | 4/2005 | Suesserman | 709/227 |
| 2005/0097008 A1* | 5/2005 | Ehring et al. | 705/26 |
| 2006/0123042 A1* | 6/2006 | Xie | G06F 16/9577 |
| 2008/0033982 A1* | 2/2008 | Parikh et al. | 707/102 |
| 2008/0168045 A1* | 7/2008 | Suponau et al. | 707/5 |
| 2008/0307308 A1 | 12/2008 | Sullivan et al. | |
| 2009/0043732 A1* | 2/2009 | Lee | 707/3 |
| 2009/0158166 A1* | 6/2009 | Dewar | G06Q 30/02 |
| | | | 715/745 |
| 2009/0287657 A1* | 11/2009 | Bennett | G06F 16/9535 |
| 2009/0287683 A1* | 11/2009 | Bennett | G06F 16/9535 |
| 2009/0287824 A1* | 11/2009 | Fisher et al. | 709/226 |
| 2010/0083172 A1* | 4/2010 | Breeds | G06F 3/0482 |
| | | | 715/810 |
| 2011/0029641 A1 | 2/2011 | Fainberg et al. | |
| 2011/0055314 A1 | 3/2011 | Rosenstein et al. | |
| 2011/0055740 A1* | 3/2011 | Coleman | G06F 3/0481 |
| | | | 715/765 |
| 2011/0066977 A1* | 3/2011 | DeLuca | G06F 16/9535 |
| | | | 715/811 |
| 2011/0173216 A1 | 7/2011 | Newman et al. | |
| 2011/0202424 A1* | 8/2011 | Chun | G06Q 30/016 |
| | | | 705/26.8 |
| 2012/0179564 A1 | 7/2012 | Soroca et al. | |
| 2012/0257560 A1* | 10/2012 | Srinivasan | H04L 67/2842 |
| | | | 370/312 |
| 2013/0007590 A1 | 1/2013 | Rivera et al. | |
| 2013/0031459 A1* | 1/2013 | Khorashadi | G06F 17/30905 |
| | | | 715/234 |
| 2013/0212465 A1 | 8/2013 | Kovatch | |
| 2013/0214995 A1* | 8/2013 | Lewin | G06F 3/1446 |
| | | | 345/1.3 |
| 2013/0262983 A1* | 10/2013 | Richter | G06F 16/9577 |
| | | | 715/234 |
| 2013/0275577 A1 | 10/2013 | Lim | |
| 2013/0332815 A1 | 12/2013 | Gallo et al. | |
| 2013/0339490 A1* | 12/2013 | Tejomurtula | H04L 67/06 |
| | | | 709/219 |
| 2014/0188814 A1* | 7/2014 | Venkatrao | G06F 17/30893 |
| | | | 707/689 |
| 2014/0222586 A1* | 8/2014 | Feldman | G06Q 30/0275 |
| | | | 705/14.71 |

FOREIGN PATENT DOCUMENTS

| | | |
|---|---|---|
| CN | 1398377 A | 2/2003 |
| JP | 2005506593 A | 3/2005 |
| JP | 2009230536 A | 10/2009 |
| JP | 2010287202 A | 12/2010 |
| JP | 2012088790 A | 5/2012 |
| JP | 2014525103 B2 | 9/2014 |
| JP | 2015513144 A | 4/2015 |
| JP | 2016163537 A | 9/2016 |
| WO | 2005091952 A2 | 10/2005 |
| WO | 2009111051 A1 | 9/2009 |

OTHER PUBLICATIONS

International Search Report for International Application No. PCT/CA2014/050445 dated Sep. 3, 2014, pp. 1-5.
Written Opinion for International Application No. PCT/CA2014/050445 dated Sep. 3, 2014, pp. 1-6.
"Changing the Load Order of a Webpage," http://www.deaconsworld.org.uk/2007/04/23/changing-the-load-order-of-a-webpage, Apr. 23, 2007.
"Page Element Load Order—How do I Prioritize Content Place Holders for Faster Load," http://forums.asp.net/t/1587098.aspx/1, Oct. 1, 2010.
"HTML5 Code Example: Intelligently Store Images in ocalStorage for Faster Page Loads," https://www.ibm.com/developerworks/mydeveloperworks/blogs/bobleah/entry/html5_code_example_store_images_using_localstorage57?lang=en, Jan. 29, 2011.
Gill, RAWLD, "The Dojo Loader," http://livedocs.dojotoolkit.org/loader/amd, 2012.
"How do I Change the Load Order of my Page," https://forums.digitalpoint.com/threads/how-do-i-change-the-load-order-of-my-page.1862381, Jul. 6, 2010.
Anonymous, "System and Method of Searching Keywords from Serial Web Pages," http://priorartdatabase.com, IPCOM/000215216, Feb. 22, 2012.
IPCOM000198571D, "System and Method for Record and Replay of Web-based Mobile Tasks," http://priorartdatabase.com, IPCOM/000198571, Aug. 9, 2010.
Office Action for U.S. Appl. No. 13/913,585 dated May 7, 2013, pp. 1-23.
Examination Report from the Intellectual Property Office of the United Kingdom for Great Britain Application No. GB1521614.6 dated Feb. 4, 2016, pp. 1-5.
Office Action for U.S. Appl. No. 13/913,585 dated Oct. 7, 2015, pp. 1-20.
Office Action for U.S. Appl. No. 13/913,585 dated Sep. 21, 2017, pp. 1-16.
Office Action for U.S. Appl. No. 13/913,585 dated Oct. 31, 2019, pp. 1-18.
Office Action for U.S. Appl. No. 13/913,585 dated May 14, 2020, pp. 1-23.
Office Action for U.S. Appl. No. 16/510,193 dated Jun. 1, 2020, pp. 1-35.
Office Action for U.S. Appl. No. 16/510,353 dated Jun. 1, 2020, pp. 1-34.

* cited by examiner

OPTIMIZING LOADING OF WEB PAGE BASED ON AGGREGATED USER PREFERENCES FOR WEB PAGE ELEMENTS OF WEB PAGE

TECHNICAL FIELD

The present invention relates generally to web pages, and more particularly to optimizing the loading of a web page based on the aggregated user preferences for the web page elements of the web page.

BACKGROUND

A web page is a web document or other web resource that is suitable for the World Wide Web and can be accessed through a web browser and displayed on a user's computing device display. Web pages may be retrieved by the web browser from a remote server, commonly referred to as a "web server." The retrieved web page may in the form of a HyperText Markup Language (HTML) document, which is read and parsed by the browser, such as into the "Document Object Model" tree structure. The browser then loads the elements of the web page (e.g., images) from the web server, such as based on the order that the elements appear in the HTML document. As a result, the user may have to wait for the entire web page to be loaded before the user can see the information they are interested in the web page. For example, when the user accesses a website for a local news television station, the user may only be interested in viewing information regarding the weather and local news. However, the user may have to wait for the entire web page to be loaded before they can view the information regarding the weather and local news if these elements are loaded last.

Such a problem is compounded by mobile computing devices, which have slower processing speeds and less memory thereby taking longer to download a web page from a web server and increasing the length of time in which the user may have to wait to view the information of interest.

As a result, the current means for loading a web page may cause the user to wait for the entire web page to be loaded, which can be a significant amount of time depending on the connection speed, prior to viewing the information of interest.

BRIEF SUMMARY

In one embodiment of the present invention, a method for optimizing the loading of a web page comprises receiving indications of web page elements of interest of a web page from a plurality of client devices. The method further comprises updating a list of web page elements of the web page sorted in terms of popularity based on the received indications of web page elements of interest of the web page. Additionally, the method comprises receiving a request to retrieve the web page. Furthermore, the method comprises accessing the sorted list of web page elements of the web page. In addition, the method comprises transmitting, by a processor, data to populate content of web page elements of the web page in an order based on the sorted list.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for optimizing the loading of a web page. In one embodiment of the present invention, the server receives indications (e.g., Document Object Model (DOM) elements) of web page elements of interest of a web page from multiple client devices. The server updates a list of web page elements for the requested web page that is sorted in terms of popularity based on these received indications of web page elements of interest. Upon establishing a list that reflects the most requested web page elements for the web page, the server may appropriately respond to a request to retrieve the web page by accessing such a list and transmitting to the browser of the requesting client device the data to populate the content of the web page elements for the requested web page in an order based on the sorted list. In this manner, the server will be able to transmit to the browser of the requesting client device the data to populate the content of the elements of the requested web page that are higher in interest prior to those of lower in interest thereby optimizing the loading of the web page (i.e., possibly reducing the waiting time for the user to view the element(s) of interest in the requested web page).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
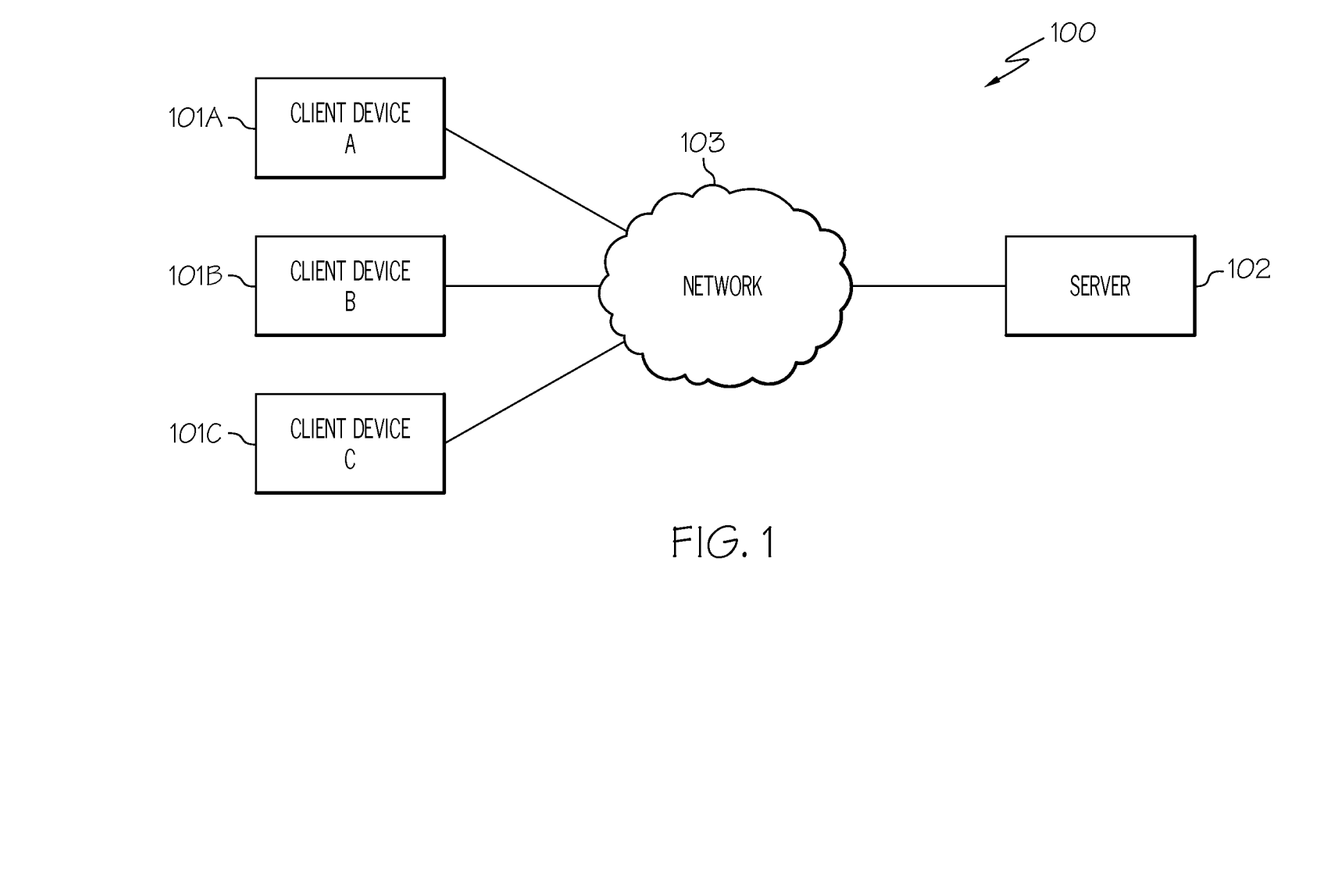
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes client devices 101A-101C (identified as "Client Device A," "Client Device B," and "Client Device C," respectively, in FIG. 1) connected to a server 102 via a network 103. Client devices 101A-101C may collectively or individually be referred to as client devices 101 or client device 101, respectively. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other client devices 101 and server 102. A description of the hardware configuration of client 101 is provided below in connection with FIG. 2.

In one embodiment, server 102 may be a web server configured to host websites. In one embodiment, server 102 is configured to transmit the data to populate the content of the elements of a web page to a browser of client device 101 in a particular order based on the relative priority of the elements of the web page as discussed further herein. A description of the hardware configuration of server 102 is provided below in connection with FIG. 3.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates three clients 101A-101C and a single server 102, network system 100 may include any number of clients 101 and servers 102. The embodiments of network system 100 are not to be limited in scope to the depiction of FIG. 1.

Figure 2:
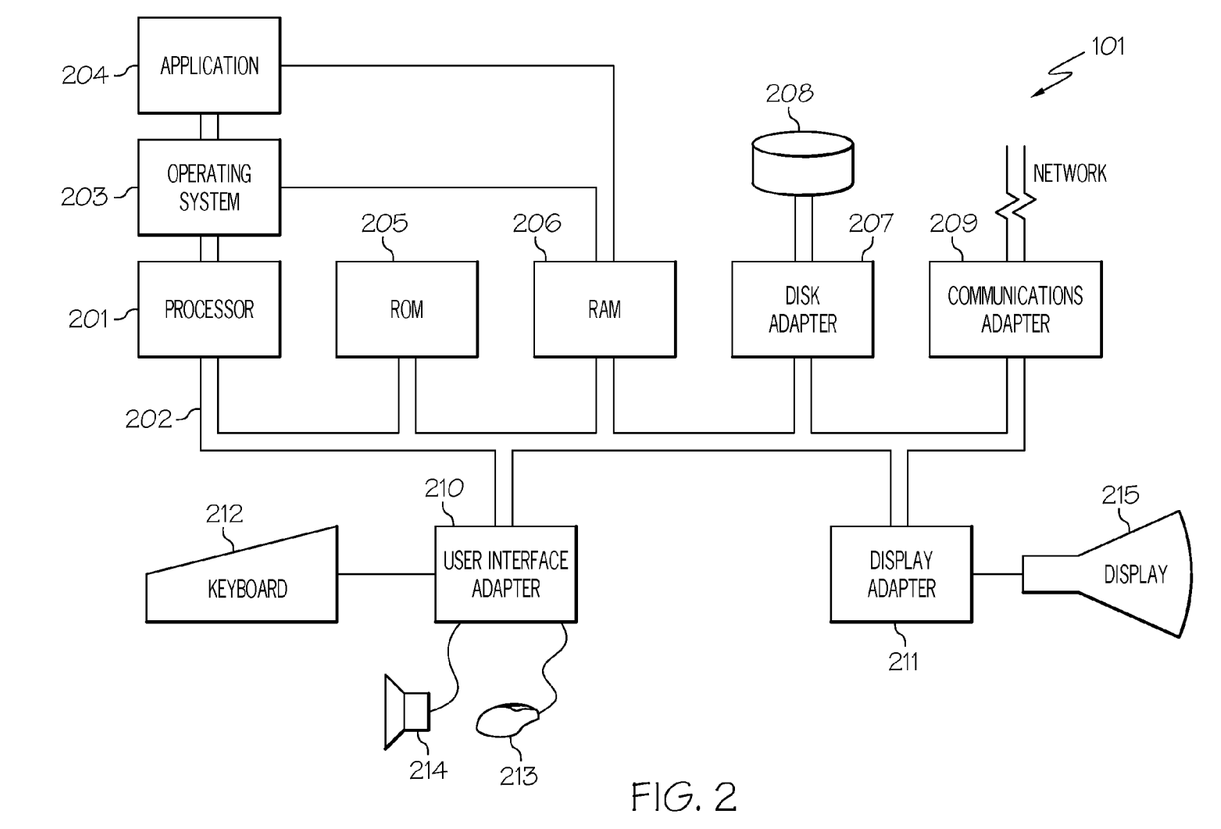
FIG. 2 illustrates a hardware configuration of a client device in accordance with an embodiment of the present invention.

Referring now to FIG. 2, FIG. 2 illustrates a hardware configuration of client 101 (FIG. 1) which is representative of a hardware environment for practicing the present invention. Referring to FIG. 2, client 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a web browser.

Referring again to FIG. 2, read-only memory ("ROM") 205 is coupled to system bus 202 and includes a basic input/output system ("BIOS") that controls certain basic functions of client 101. Random access memory ("RAM") 206 and disk adapter 207 are also coupled to system bus 202. It should be noted that software components including operating system 203 and application 204 may be loaded into RAM 206, which may be client's 101 main memory for execution. Disk adapter 207 may be an integrated drive electronics ("IDE") adapter that communicates with a disk unit 208, e.g., disk drive.

Client 101 may further include a communications adapter 209 coupled to bus 202. Communications adapter 209 interconnects bus 202 with an outside network (e.g., network 103 of FIG. 1) thereby enabling client 101 to communicate with other clients 101 and server 102.

I/O devices may also be connected to client 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to client 101 through keyboard 212 or mouse 213 and receiving output from client 101 via display 215 or speaker 214.

Figure 3:
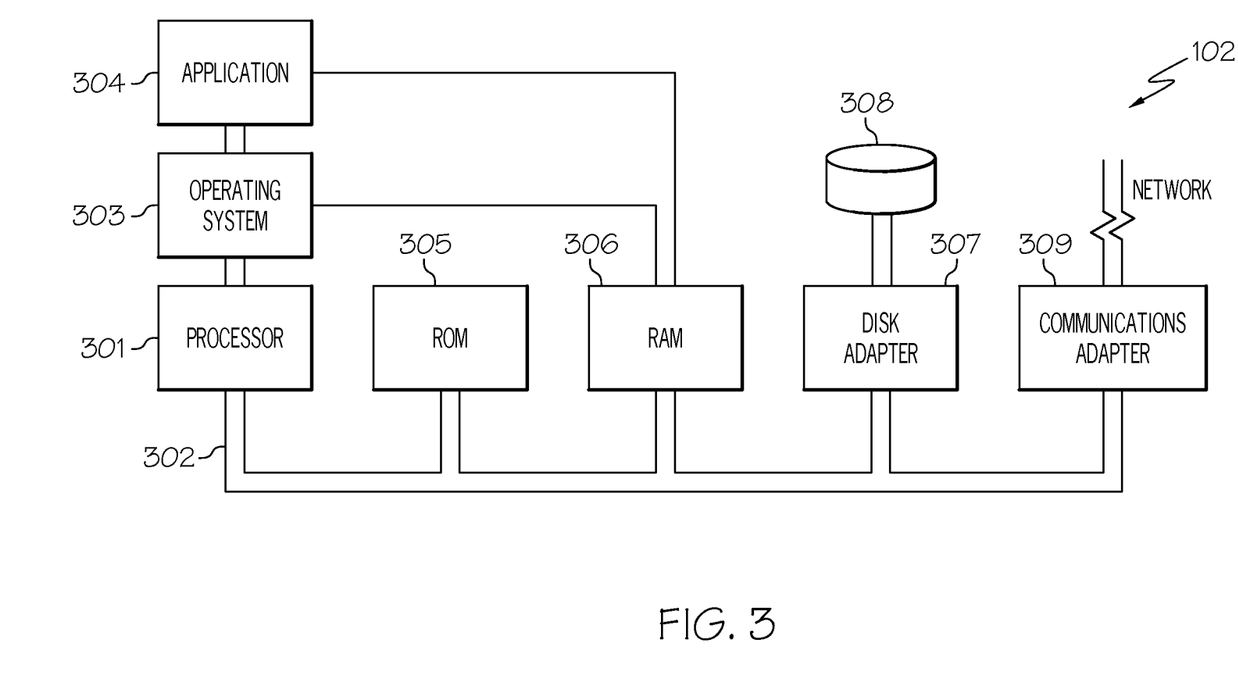
FIG. 3 illustrates a hardware configuration of a server in accordance with an embodiment of the present invention.

Referring now to FIG. 3, FIG. 3 illustrates a hardware configuration of server 102 (FIG. 1) which is representative of a hardware environment for practicing the present invention. Server 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for optimizing the loading of a web page as discussed further below in association with FIGS. 4-7.

Referring again to FIG. 3, read-only memory ("ROM") 305 is coupled to system bus 302 and includes a basic input/output system ("BIOS") that controls certain basic functions of server 102. Random access memory ("RAM") 306 and disk adapter 307 are also coupled to system bus 302. It should be noted that software components including operating system 303 and application 304 may be loaded into RAM 306, which may be server's 102 main memory for execution. Disk adapter 307 may be an integrated drive electronics ("IDE") adapter that communicates with a disk unit 308, e.g., disk drive. It is noted that the program for optimizing the loading of a web page, as discussed further below in association with FIGS. 4-7, may reside in disk unit 308 or in application 304.

Server 102 may further include a communications adapter 309 coupled to bus 302. Communications adapter 309 interconnects bus 302 with an outside network (e.g., network 103 of FIG. 1) thereby enabling server 102 to communicate with client 101 (FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, a web page is a web document or other web resource that is suitable for the World Wide Web and can be accessed through a web browser and displayed on a user's computing device display. Web pages may be retrieved by the web browser from a remote server, commonly referred to as a "web server." The retrieved web page may in the form of a HyperText Markup Language (HTML) document, which is read and parsed by the browser, such as into the "Document Object Model" tree structure. The browser then loads the elements of the web page (e.g., images) from the web server, such as based on the order that the elements appear in the HTML document. As a result, the user may have to wait for the entire web page to be loaded before the user can see the information they are interested in the web page. For example, when the user accesses a website for a local news television station, the user may only be interested in viewing information regarding the weather and local news. However, the user may have to wait for the entire web page to be loaded before they can view the information regarding the weather and local news if these elements are loaded last. Such a problem is compounded by mobile computing devices, which have slower processing speeds and less memory thereby taking longer to download a web page from a web server and increasing the length of time in which the user may have to wait to view the information of interest. As a result, the current means for loading a web page may cause the user to wait for the entire web page to be loaded, which can be a significant amount of time depending on the connection speed, prior to viewing the information of interest.

Figure 4:
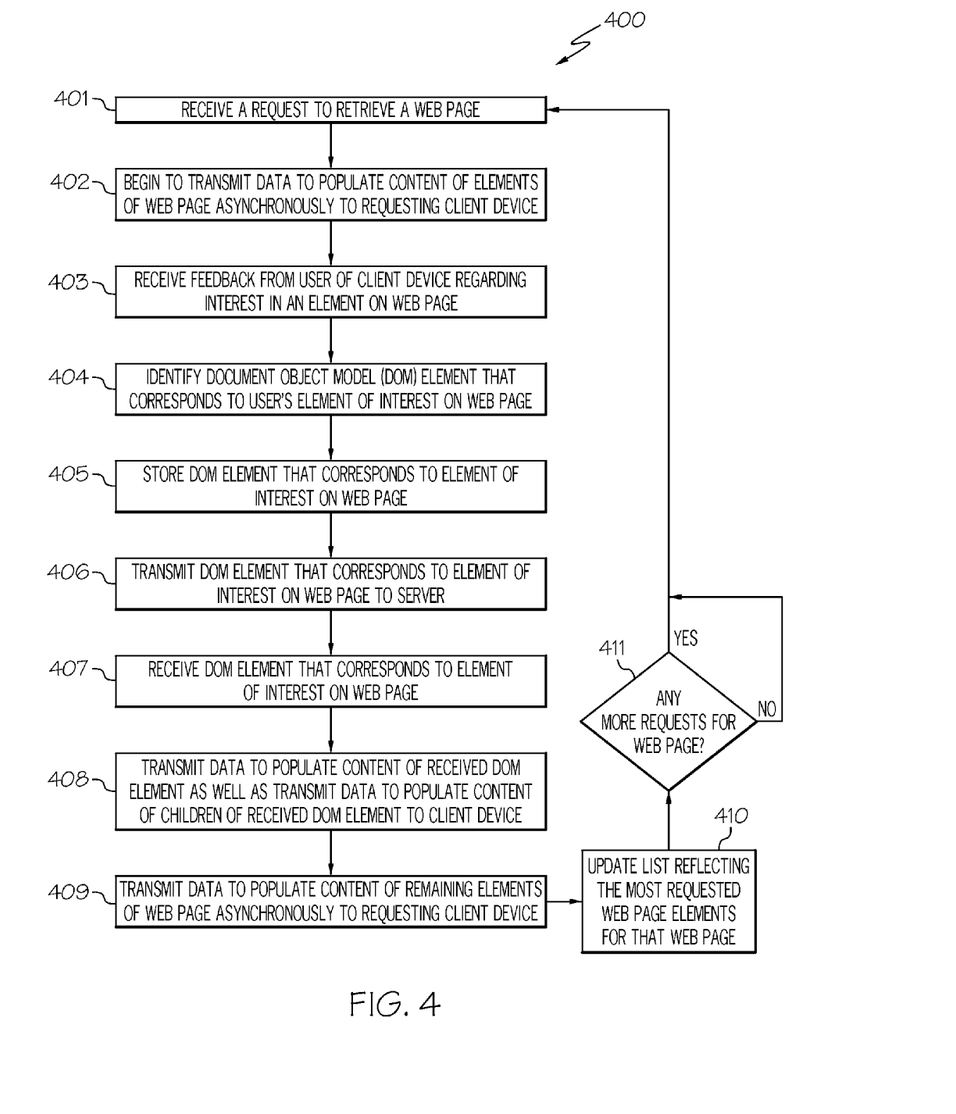
FIG. 4 is a flowchart of a method for optimizing the loading of a web page in accordance with an embodiment of the present invention.
Figure 5:
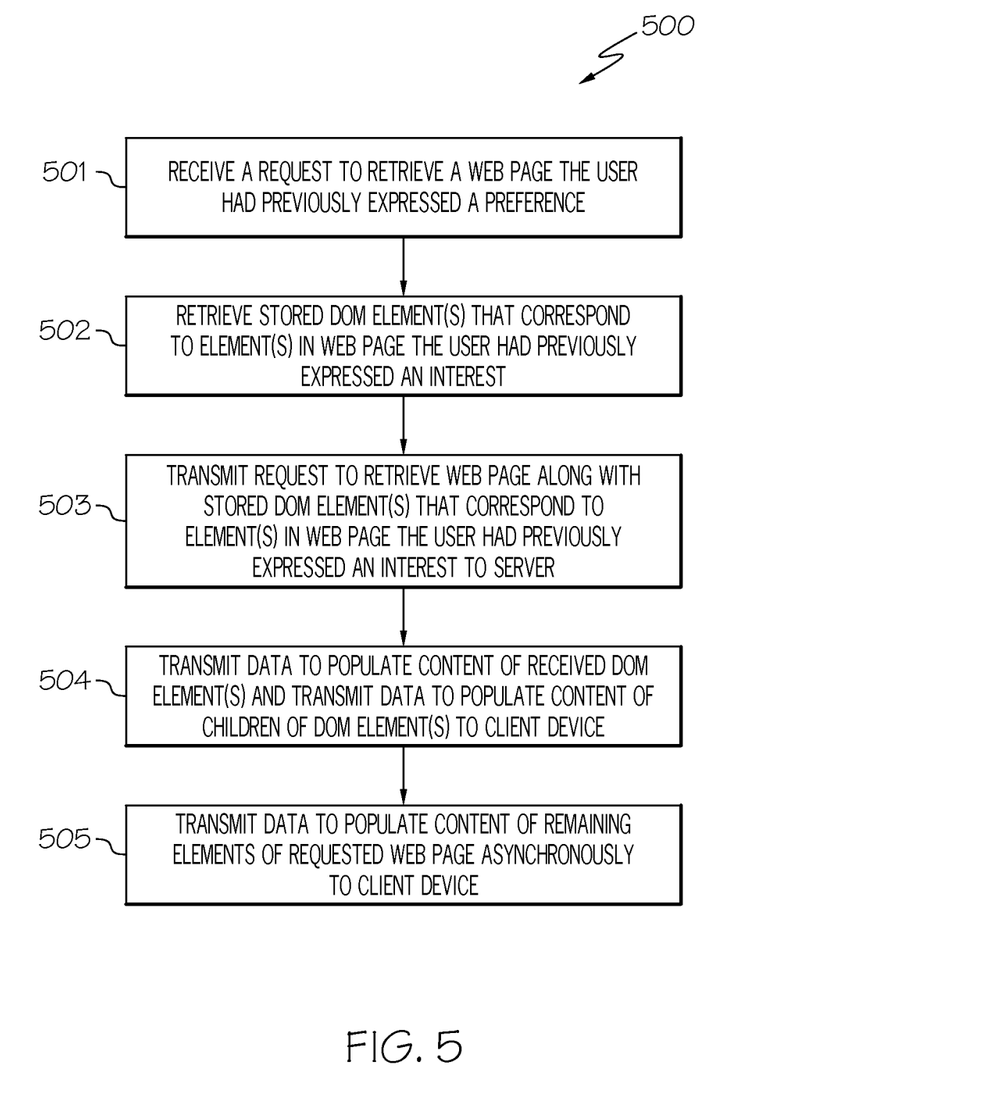
FIG. 5 is a flowchart of a method for retrieving a web page, where the user had previously expressed an interest in an element(s) on that web page in accordance with an embodiment of the present invention.
Figure 6:
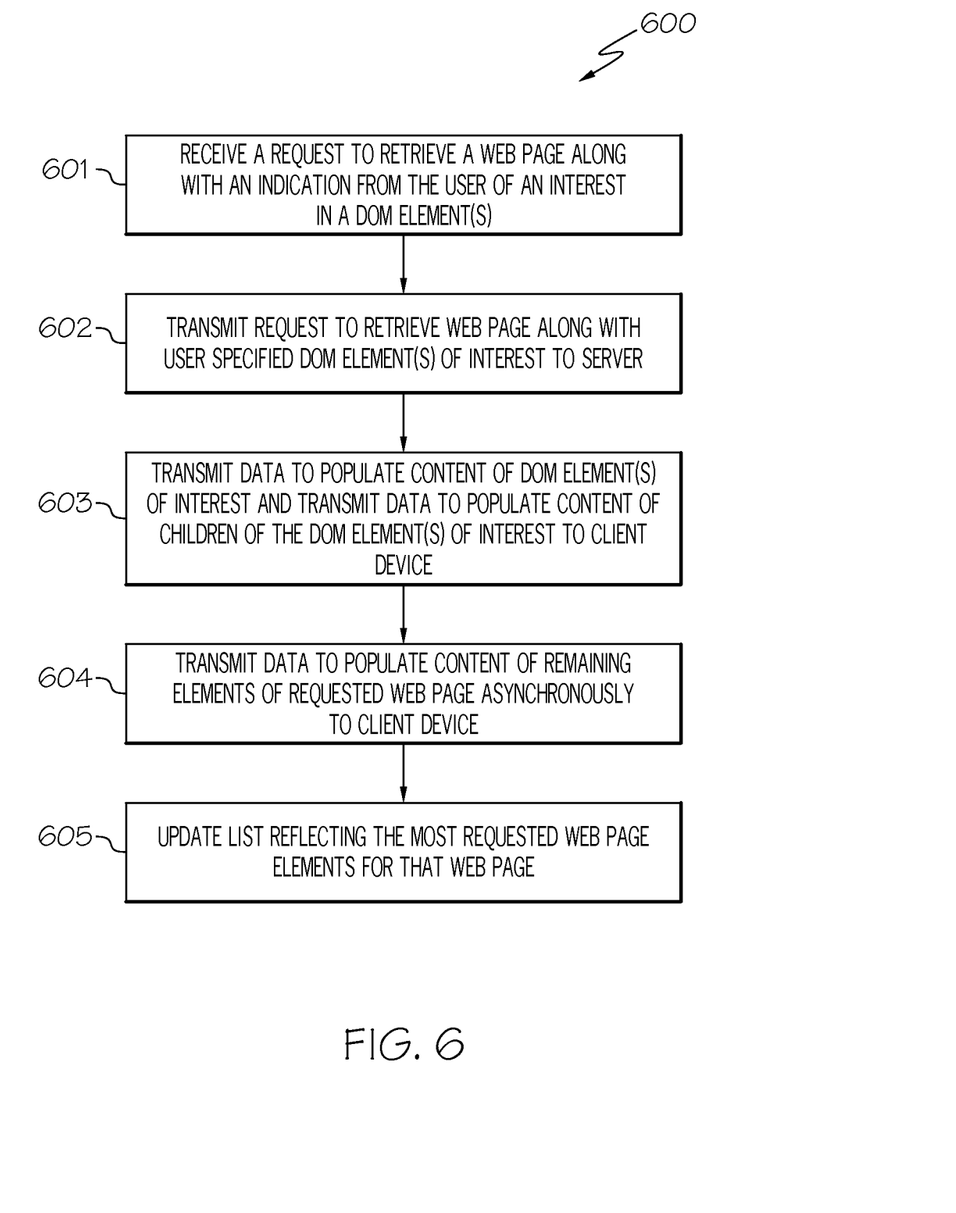
FIG. 6 is a flowchart of a method for retrieving a web page when the user concurrently expresses an element(s) of interest along with the request to retrieve a web page in accordance with an embodiment of the present invention.
Figure 7:
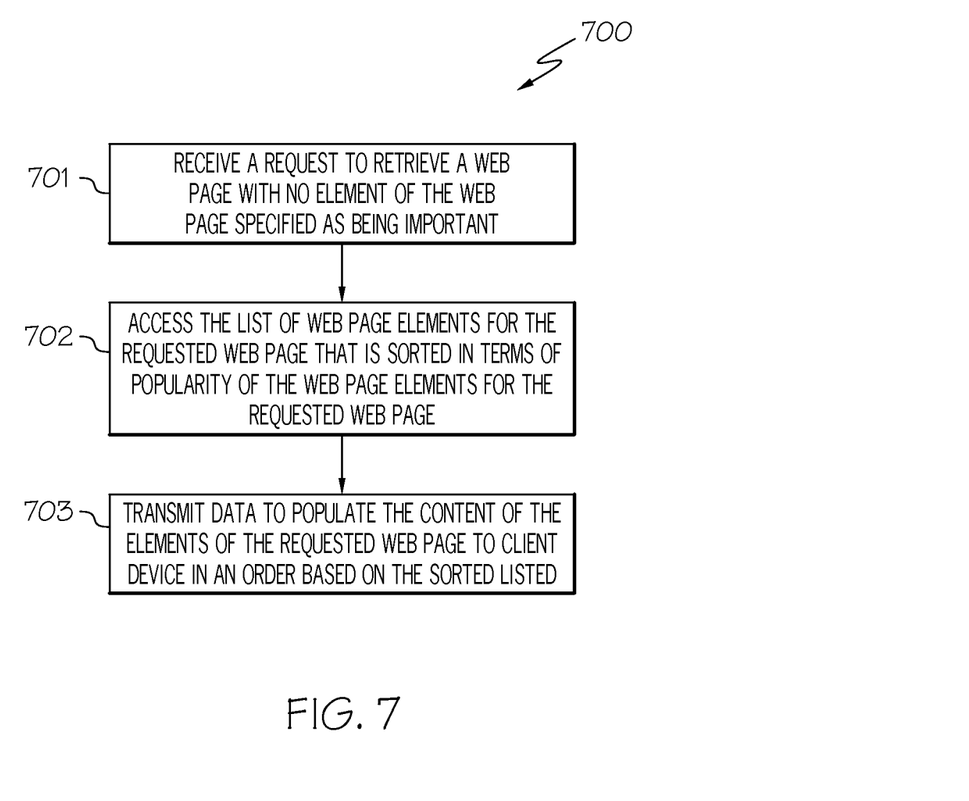
FIG. 7 is a flowchart of a method for retrieving a web page when the user does not express an element of interest for the requested web page in accordance with an embodiment of the present invention.

The principles of the present invention provide a means for loading elements of a web page based on the relative priority of the elements of the web page thereby loading elements of interest prior to elements of non-interest as discussed further below in connection with FIGS. 4-7. FIG. 4 is a flowchart of a method for optimizing the loading of a web page. FIG. 5 is a flowchart of a method for retrieving a web page, where the user had previously expressed an interest in an element(s) on that web page. FIG. 6 is a flowchart of a method for retrieving a web page when the user concurrently expresses an element(s) of interest along with the request to retrieve a web page. FIG. 7 is a flowchart of a method for retrieving a web page when the user does not express an element of interest for the requested web page.

As stated above, FIG. 4 is a flowchart of a method 400 for optimizing the loading of a web page in accordance with an embodiment of the present invention.

Referring to FIG. 4, in conjunction with FIGS. 1-3, in step 401, server 102 receives a request from client device 101 to retrieve a web page. For example, client device 101 may initially receive a request to retrieve a web page from server 102 from the user of client device 101. For instance, the user may type in the Uniform Resource Identifier (URL) in the browser corresponding to the web page to be retrieved from server 102. Client device 101 may then send the request to server 102 to retrieve the requested web page.

In step 402, server 102 begins to transmit the data to populate the content of the elements of the requested web page asynchronously to the requesting client device 101. The browser of client device 101 will then start displaying these elements on display 215 as they are received from server 102.

In step 403, the browser of client device 101 receives feedback from the user of client 101 regarding an interest in a particular element on the requested web page displayed on display 215. For example, the user may indicate an element of interest in the requested web page by selecting an area on the web page. For instance, the user may draw an outline around the element of interest on the web page.

In step 404, the browser of client device 101 identifies the Document Object Model (DOM) element of the DOM tree structure for the requested web page that corresponds to the user's element of interest on the web page. That is, the browser identifies the DOM element that corresponds to the element of interest on the web page that was expressed by the user in step 403.

In step 405, the browser of client device 101 stores the DOM element (e.g., caches the DOM element in a local cache, such as a cache in memory 206) for later retrieval as discussed further below in connection with FIG. 5.

In step 406, the browser of client device 101 transmits an indication (e.g., DOM element) that corresponds to the user's element of interest on the web page to server 102. In one embodiment, client device 101 utilizes an Asynchronous Module Definition (AMD) Application Programming Interface (API) to communicate with server 102 for defining web page elements of interest and their children that can be asynchronously loaded as discussed below.

In step 407, server 102 receives the indication (e.g., DOM element) that corresponds to the user's element of interest on the web page.

In step 408, server 102 transmits the data (e.g., dynamic data, such as a YouTube® video) to populate the content of the received DOM element as well as transmits the data to populate the content of the children of the received DOM element to client device 101.

In step 409, server 102 transmits the data to populate the content of the remaining elements of the web page asynchronously to the requesting client device 101. That is, server 102 transmits the data to populate the content of the remaining DOM elements (and their children) of the DOM tree structure asynchronously to the requesting client device 101 for the requested web page.

In step 410, server 102 updates a list of web page elements for the requesting web page that is sorted in terms of popularity based on the received indication (e.g., DOM element) of a web page element of interest (indication received in step 407) from that user as well as indications received from other users as discussed further below. That is, server 102 updates a list of web page elements for the requesting web page that is sorted based on a number of received DOM elements (corresponding to the users' elements of interest on the web page) for each element on the web page. In one embodiment, such a list is stored in a data storage unit (e.g., memory 306, disk unit 308). In this manner, server 102 maintains a record for the most requested web page elements for that web page. Such a record may be dynamically updated based on the response from other users as discussed below in connection with step 411. As a result, server 102 will be able to transmit to the browser of client device 101 the data to populate the content of the elements of the requested web page based on the relative priority of the elements of the web page as discussed further below in connection with FIG. 7.

The above process (steps 401-410) may be repeated in order for server 102 to obtain additional feedback from other users concerning elements of interest on a web page. By obtaining additional feedback from other users concerning elements of interest on a web page, server 102 will be able to develop a list, which could be in the form of a map, that sorts or identifies elements of interest in the web page based on users' expressed interest for various elements on the web page. In this manner, server 102 will be able to transmit to the browser of client device 101 the data to populate the content of the elements of the requested web page to be loaded by the browser that are higher in interest prior to those of lower in interest thereby optimizing the loading of the web page (i.e., possibly reducing the waiting time for the user to view the element(s) of interest in the requested web page).

Referring to step 411, a determination is made by server 102 as to whether there are any more requests for the web page. If there is another request for the web page, then server 102 receives a request from client device 101 to retrieve the web page in step 401.

If, however, server 102 does not receive a request for the web page, then, server 102 continues to monitor for additional requests for the web page in step 411.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

As discussed above, in connection with method 400, the browser of client device 101 may store the DOM element (e.g., caches the DOM element in a local cache, such as a cache in memory 206) for later retrieval in response to identifying the DOM element of the DOM tree structure that corresponds to the user's element of interest on the web page. In the course of future browsing, the user may return to the same web page where the user has already expressed an interest in an element(s) on that web page as discussed below in connection with FIG. 5.

FIG. 5 is a flowchart of a method 500 for retrieving a web page, where the user had previously expressed an interest in an element(s) on that web page in accordance with an embodiment of the present invention.

Referring to FIG. 5, in conjunction with FIGS. 1-3, in step 501, the browser of client device 101 receives a request to retrieve a web page the user had previously expressed a preference. That is, the browser of client device 101 receives a request to retrieve a web page, where the user had previously expressed an interest in an element(s) on that web page.

In step 502, the browser of client device 101 retrieves the stored DOM element(s) that correspond to the element(s) in the web page the user had previously expressed an interest. As discussed above, the browser of client device 101 stores the DOM element (e.g., caches the DOM element in a local cache, such as a cache in memory 206) for later retrieval in step 405 of method 400 (FIG. 4) in response to identifying the DOM element of the DOM tree structure that corresponds to the user's element of interest on the web page.

In step 503, the browser of client device 101 transmits the request to retrieve the web page along with the stored DOM element(s) that correspond to the element(s) in the web page the user had previously expressed an interest to server 102.

In step 504, server 102 transmits the data (e.g., dynamic data, such as a YouTube® video) to populate the content of the received DOM element as well as transmits the data to populate the content of the children of the received DOM element(s) to client device 101.

In step 505, server 102 transmits the data to populate the content of the remaining elements of the requested web page asynchronously to the requesting client device 101. That is, server 102 transmits the data to populate the content of the remaining DOM elements (and their children) of the DOM tree structure asynchronously to the requesting client device 101 for the requested web page.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

As previously discussed in connection with FIG. 4, the user may provide feedback concerning an element of interest in the requested web page after the element of interest is displayed on display 215 of client device 101. However, the user may also concurrently express an element(s) of interest along with the request to retrieve a web page as discussed below in connection with FIG. 6.

FIG. 6 is a flowchart of a method 600 for retrieving a web page when the user concurrently expresses an element(s) of interest along with the request to retrieve a web page in accordance with an embodiment of the present invention.

Referring to FIG. 6, in conjunction with FIGS. 1-3, in step 601, the browser of client device 101 receives a request to retrieve a web page along with an indication from the user of an interest in a DOM element(s).

In step 602, the browser of client device 101 transmits the request to retrieve the web page along with the user specified DOM element(s) of interest to server 102.

In step 603, server 102 transmits the data to populate the content of the DOM element(s) of interest as well as transmits the data to populate the content of the children of the DOM element(s) of interest to client device 101.

In step 604, server 102 transmits the data to populate the content of the remaining elements of the requested web page asynchronously to the requesting client device 101. That is, server 102 transmits the data to populate the content of the remaining DOM elements (and their children) of the DOM tree structure asynchronously to the requesting client device 101 for the requested web page.

In step 605, server 102 updates a list of elements for the requesting web page that is sorted in terms of popularity based on the received DOM elements corresponding to the user's elements of interest on the web page. That is, server 102 updates a list that reflects the most requested web page elements for that web page.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

Upon establishing a list that reflects the most requested web page elements for that web page, server 102 may appropriately respond with transmitting to the browser of client device 101 the data to populate the content of elements of higher interest prior to the elements of lower interest in the requested web page to be loaded by the browser thereby optimizing the loading of the web page (i.e., possibly reducing the waiting time for the user to view the element(s) of interest in the requested web page) as discussed below in connection with FIG. 7.

FIG. 7 is a flowchart of a method 700 for retrieving a web page when the user does not express an element of interest for the requested web page in accordance with an embodiment of the present invention.

Referring to FIG. 7, in conjunction with FIGS. 1-3, in step 701, server 102 receives a request to retrieve a web page with no element of the web page specified as being important from client device 101.

In step 702, server 102 accesses the list of web page elements for the requested web page that is sorted in terms of popularity of the web page elements for the requested web page.

In step 703, server 102 transmits the data to populate the content of the elements of the requested web page to client device 101 in an order based on the sorted listed. In this manner, server 102 transmits to client device 101 the data to populate the content of the elements of higher interest prior to the elements of lower interest in the requested web page thereby optimizing the loading of the web page (i.e., possibly reducing the waiting time for the user to view the element(s) of interest in the requested web page).

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a non-transitory computer readable storage medium for optimizing a loading of a web page, the computer program product comprising programming instructions for:

receiving indications of web page elements of interest of said web page from a plurality of client devices, wherein said indications of web page elements of interest of said web page are expressed as Document Object Model (DOM) elements, wherein an indication of a web page element of interest of said web page is identified in response to a user selection of an area on said web page;

updating a list of web page elements of said web page sorted in terms of popularity based on said received indications of web page elements of interest of said web page;

receiving a request to retrieve said web page;

accessing said sorted list of web page elements of said web page; and transmitting data to populate content of web page elements of said web page in an order based on said sorted list: wherein said content of said web page elements of said web page comprises content of a DOM element of said DOM elements of said web page and children of said DOM element of said web page that is transmitted to a client device and content of remaining elements of said web page that is transmitted asynchronously to said client device.

2. The computer program product as recited in claim 1 further comprising the programming instructions for:

transmitting data to populate content of said DOM element of said web page to said client device and transmitting data to populate content of children of said DOM element of said web page to said client device in response to receiving said DOM element corresponding to an element of interest of said web page.

3. The computer program product as recited in claim 1 further comprising the programming instructions for:

forming said list of web page elements of said web page sorted in terms of popularity based on said received indications of web page elements of interest of said web page.

4. The computer program product as recited in claim 1, wherein said user selection comprises drawing an outline around said element of interest on said web page.

5. The computer program product as recited in claim 1, wherein one or more client devices of said plurality of client devices utilize an Asynchronous Module Definition (AMD) Application Programming Interface (API) for defining web page elements of interest and their children that can be asynchronously loaded.

6. A system, comprising:

a memory unit for storing a computer program for optimizing a loading of a web page; and a processor coupled to said memory unit, wherein said processor is configured to execute the program instructions of the computer program comprising:

receiving indications of web page elements of interest of said web page from a plurality of client devices, wherein said indications of web page elements of interest of said web page are expressed as Document Object Model (DOM) elements, wherein an indication of a web page element of interest of said web page is identified in response to a user selection of an area on said web page;

updating a list of web page elements of said web page sorted in terms of popularity based on said received indications of web page elements of interest of said web page;

receiving a request to retrieve said web page;

accessing said sorted list of web page elements of said web page; and transmitting data to populate content of web page elements of said web page in an order based on said sorted list: wherein said content of said web page elements of said web page comprises content of a DOM element of said DOM elements of said web page and children of said DOM element of said web page that is transmitted to a client device and content of remaining elements of said web page that is transmitted asynchronously to said client device.

7. The system as recited in claim 6, wherein the program instructions of the computer program further comprises:

transmitting data to populate content of said DOM element of said web page to said client device and transmitting data to populate content of children of said DOM element of said web page to said client device in response to receiving said DOM element corresponding to an element of interest of said web page.

8. The system as recited in claim 6, wherein the program instructions of the computer program further comprises:

forming said list of web page elements of said web page sorted in terms of popularity based on said received indications of web page elements of interest of said web page.

9. The system as recited in claim 6, wherein said user selection comprises drawing an outline around said element of interest on said web page.

10. The system as recited in claim 6, wherein one or more client devices of said plurality of client devices utilize an Asynchronous Module Definition (AMD) Application Programming Interface (API) for defining web page elements of interest and their children that can be asynchronously loaded.

* * * * *